United States Patent
Saluja et al.

(10) Patent No.: US 12,086,257 B2
(45) Date of Patent: Sep. 10, 2024

(54) TRUSTED FIRMWARE VERIFICATION

(71) Applicant: VMware, Inc., Palo Alto, CA (US)

(72) Inventors: Neeraj Saluja, Round Rock, TX (US);
Muhammad Anadil Furqan, Austin, TX (US)

(73) Assignee: Omnissa, LLC, Palo Alto, CA (US)

( * ) Notice: Subject to any disclaimer, the term of this patent is extended or adjusted under 35 U.S.C. 154(b) by 335 days.

(21) Appl. No.: 16/857,971

(22) Filed: Apr. 24, 2020

(65) Prior Publication Data
US 2021/0334380 A1   Oct. 28, 2021

(51) Int. Cl.
G06F 21/57 (2013.01)
G06F 21/44 (2013.01)
H04L 9/32 (2006.01)
H04L 9/00 (2022.01)

(52) U.S. Cl.
CPC ............ G06F 21/572 (2013.01); G06F 21/44 (2013.01); H04L 9/3247 (2013.01); H04L 9/3265 (2013.01); H04L 9/3268 (2013.01); G06F 2221/033 (2013.01); H04L 9/50 (2022.05)

(58) Field of Classification Search
CPC .. G06F 21/572; G06F 21/44; G06F 2221/033; G06F 21/568; G06F 2221/034; H04L 9/3247; H04L 9/3265; H04L 9/3268; H04L 2209/38; H04L 9/50; H04L 9/3263
See application file for complete search history.

(56) References Cited

U.S. PATENT DOCUMENTS

| | | | | |
|---|---|---|---|---|
| 6,067,297 A | * | 5/2000 | Beach | H04W 88/08 370/389 |
| 6,449,686 B1 | * | 9/2002 | Frappier | G06F 3/0682 711/112 |
| 7,043,664 B1 | * | 5/2006 | Chiloyan | G06F 11/1417 714/E11.133 |
| 7,730,295 B1 | * | 6/2010 | Lee | G06F 9/4401 713/1 |

(Continued)

FOREIGN PATENT DOCUMENTS

| | | | | |
|---|---|---|---|---|
| CA | 3213626 A1 | * | 10/2022 | ..... G01R 31/318538 |
| CN | 100382188 C | * | 4/2008 | |

(Continued)

*Primary Examiner* — Shahriar Zarrineh
(74) *Attorney, Agent, or Firm* — Kim & Stewart LLP

(57) ABSTRACT

Disclosed are various examples for verification and management of firmware for client devices enrolled with a management service of an enterprise. The firmware verification includes a verification process using multiple checkpoints for determining whether status responses associated with firmware installed on and received from a managed client device can be trusted. The multiple checkpoints can include verifying certificate data, signature data, and an exit code included in status responses received from managed devices. In the event that one of the verification steps fails, the device can be considered compromised and subject to various compliance actions. The compliance actions can include limiting access to enterprise data, limiting access to one or more applications, wiping a device clean to reset the devices to the original factory settings, sending a notification to an enterprise administrator providing an indication of the detected compromise, and other types of compliance actions.

20 Claims, 3 Drawing Sheets

(56) References Cited

U.S. PATENT DOCUMENTS

| | | | | |
|---|---|---|---|---|
| 7,843,907 B1* | 11/2010 | Abou-Emara | H04L 49/901 | 370/386 |
| 8,281,119 B1* | 10/2012 | Spangler | G06F 9/4401 | 713/1 |
| 8,560,823 B1* | 10/2013 | Aytek | G06F 8/654 | 713/2 |
| 9,015,694 B2* | 4/2015 | Gray | G06F 8/654 | 717/170 |
| 9,081,954 B2* | 7/2015 | Forristal | G06F 11/3055 | |
| 10,133,654 B1* | 11/2018 | Deiderich, III | G06F 11/3636 | |
| 10,372,661 B1* | 8/2019 | Hoffmann | G06F 13/4282 | |
| 2004/0025027 A1* | 2/2004 | Balard | G06F 21/31 | 713/183 |
| 2004/0025036 A1* | 2/2004 | Balard | G06F 21/575 | 713/176 |
| 2004/0054907 A1* | 3/2004 | Chateau | G06F 21/10 | 713/181 |
| 2004/0177340 A1* | 9/2004 | Hsu | G11B 27/36 | 717/106 |
| 2004/0186690 A1* | 9/2004 | Swanson | H05K 1/0266 | 702/187 |
| 2004/0215440 A1* | 10/2004 | Crowell | G06F 9/45504 | 703/22 |
| 2006/0005046 A1* | 1/2006 | Hars | G06F 21/572 | 714/E11.207 |
| 2007/0101034 A1* | 5/2007 | Ta | G06F 11/366 | 710/48 |
| 2007/0292406 A1* | 12/2007 | Kang | C12Q 1/28 | 424/94.4 |
| 2007/0300207 A1* | 12/2007 | Booth | G06F 21/575 | 717/124 |
| 2010/0058317 A1* | 3/2010 | Braams | G06F 21/572 | 717/171 |
| 2010/0082955 A1* | 4/2010 | Chhabra | H04L 9/3247 | 713/1 |
| 2010/0169750 A1* | 7/2010 | Chew | G06F 21/572 | 714/E11.024 |
| 2012/0124568 A1* | 5/2012 | Fallon | G06F 9/453 | 717/169 |
| 2012/0165728 A1* | 6/2012 | Strickland | H04W 76/14 | 604/66 |
| 2012/0167205 A1* | 6/2012 | Ghetie | G06F 21/572 | 726/22 |
| 2012/0173873 A1* | 7/2012 | Bell | H04L 9/3263 | 713/168 |
| 2014/0075241 A1* | 3/2014 | Oh | G06F 11/141 | 714/15 |
| 2014/0109076 A1* | 4/2014 | Boone | H04L 63/105 | 717/170 |
| 2014/0129613 A1* | 5/2014 | Van Depoel | H04L 65/612 | 709/202 |
| 2014/0245085 A1* | 8/2014 | Halverson | G06F 11/0778 | 714/57 |
| 2015/0052596 A1* | 2/2015 | Ayanam | H04W 4/38 | 726/8 |
| 2015/0113266 A1* | 4/2015 | Wooten | H04L 9/3234 | 713/155 |
| 2015/0149991 A1* | 5/2015 | Chen | G06F 11/1402 | 717/172 |
| 2015/0261521 A1* | 9/2015 | Choi | H04L 9/3236 | 713/176 |
| 2015/0271297 A1* | 9/2015 | Zimmer | H04L 1/0041 | 709/203 |
| 2015/0319160 A1* | 11/2015 | Ferguson | G06F 21/6281 | 726/10 |
| 2016/0210133 A1* | 7/2016 | Lee | G06F 21/572 | |
| 2016/0378990 A1* | 12/2016 | Goodman | G06F 21/572 | 726/19 |
| 2017/0302640 A1* | 10/2017 | Maletsky | H04L 63/12 | |
| 2018/0032718 A1* | 2/2018 | Soto | G06F 21/606 | |
| 2018/0129809 A1* | 5/2018 | Zhang | H04L 9/3247 | |
| 2018/0131677 A1* | 5/2018 | Brickell | H04L 9/3247 | |
| 2018/0181758 A1* | 6/2018 | Branco | G06F 21/572 | |
| 2018/0322012 A1* | 11/2018 | Sharma | G06F 11/0793 | |
| 2019/0018669 A1* | 1/2019 | Cook | G06F 16/2365 | |
| 2019/0026470 A1* | 1/2019 | Goda | G06F 1/3275 | |
| 2019/0034637 A1* | 1/2019 | Cho | H04L 63/08 | |
| 2019/0147165 A1* | 5/2019 | Chen | H04L 9/0643 | 726/22 |
| 2019/0156029 A1* | 5/2019 | Ashey | G06F 21/57 | |
| 2019/0163465 A1* | 5/2019 | Fassino | H04L 63/0823 | |
| 2019/0179628 A1* | 6/2019 | Bulusu | G06F 9/4401 | |
| 2019/0260718 A1* | 8/2019 | Buendgen | H04L 9/0822 | |
| 2019/0384586 A1* | 12/2019 | Jiang | H04L 9/06 | |
| 2020/0019397 A1* | 1/2020 | Duran | H04L 9/3247 | |
| 2020/0097660 A1* | 3/2020 | Goda | G06F 8/65 | |
| 2020/0104504 A1* | 4/2020 | Chaiken | G06F 21/575 | |
| 2020/0119929 A1* | 4/2020 | Edwards | H04L 9/3265 | |
| 2020/0151336 A1* | 5/2020 | Maletsky | G06F 21/572 | |
| 2020/0162247 A1* | 5/2020 | Nix | H04L 63/0838 | |
| 2020/0201617 A1* | 6/2020 | Park | G06F 11/1458 | |
| 2020/0210586 A1* | 7/2020 | Cariello | G06F 21/57 | |
| 2020/0226300 A1* | 7/2020 | Marchese | G06F 21/575 | |
| 2020/0257518 A1* | 8/2020 | Liedtke | G06F 8/65 | |
| 2020/0410097 A1* | 12/2020 | Miller | G06F 21/64 | |
| 2021/0157921 A1* | 5/2021 | Brown | G06F 21/575 | |
| 2021/0232681 A1* | 7/2021 | Tsirkin | G06F 21/44 | |
| 2022/0121748 A1* | 4/2022 | Anbazhagan | G06F 8/65 | |

FOREIGN PATENT DOCUMENTS

| | | | | |
|---|---|---|---|---|
| CN | 102317906 A | * | 1/2012 | G06F 8/65 |
| CN | 103823723 A | * | 5/2014 | G06F 11/1433 |
| CN | 109074449 A | * | 12/2018 | G06F 21/44 |
| CN | 215872331 U | * | 2/2022 | |
| EP | 3024175 A1 | * | 5/2016 | G06F 8/65 |
| KR | 20080112010 A | * | 12/2008 | |

* cited by examiner

TRUSTED FIRMWARE VERIFICATION

BACKGROUND

With the emergence of bring-your-own-device (BYOD) technology in the workplace, enterprises permit employees or other personnel to use their own devices for business purposes. This can include accessing enterprise data, such as email and corporate documents. In addition, enterprises can provide company-owned devices to employees that may be used for personal use and therefore can be used to connect over secured or unsecured networks. However, a company can require the employee to enroll the device with a management service capable of protecting enterprise data from theft, loss, and unauthorized access. Administrators can utilize the management service to oversee operation of the devices enrolled with or otherwise managed by the service.

Typically, devices such as laptops, tablets, and mobile phones are required to abide by the enterprise policies. In these environments, administrators are tasked with setting and enforcing security policies on the managed devices based on the capabilities of the different devices. As devices enrolled with the management service have operating systems and applications installed thereon, capabilities of the operating systems and applications are constantly being changed when patches, security fixes, upgrades, and other updates are made available and installed on the devices.

With regard to firmware, Original Equipment Manufacturers (OEMs) or other third-party entities may provide tools that can interact with the management service to allow the management service to access status information for firmware on a given device. However, while the device can be queried to provide information regarding the status of the firmware, the response that is generated and provided by the OEM and related tools and may be compromised. As such, the response may be not be considered trustworthy as the the managed device may be compromised such that the enterprise data may be at risk of numerous security vulnerabilities, such as theft, loss, and unauthorized access.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
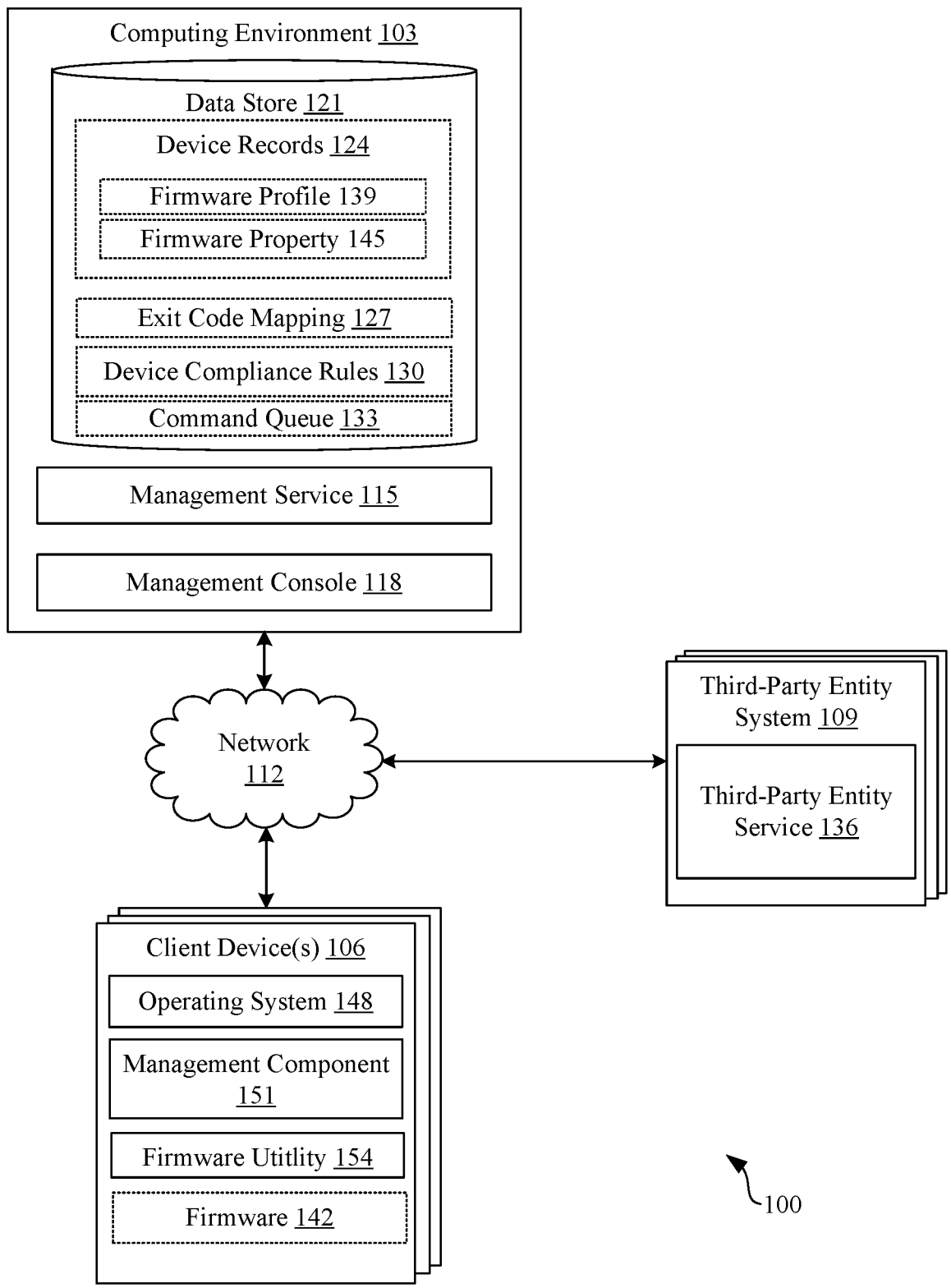
FIG. 1 is a drawing of a networked environment including a management service that communicates firmware profiles to managed devices.

The present disclosure relates to verification and management of firmware for client devices enrolled with a management service of an enterprise. In particular, the present disclosure provides a verification process using multiple checkpoints for determining whether status responses associated with firmware installed on and received from a managed client device can be trusted. The multiple checkpoints can include, for example, separately verifying certificate data, signature data, and exit codes included in status responses received from managed devices. In the event that one of the multi-checkpoint verification steps fails, the device can be considered compromised and subject to various compliance actions. The compliance actions can include, for example, limiting access to enterprise data, limiting access to one or more applications, wiping a device clean to reset the devices to the original factory settings, sending a notification to an enterprise administrator providing an indication of the detected compromise, and other types of compliance actions.

Enterprises permit employees or other personnel to use their own devices for business purposes. An enterprise can have a management service that interacts with the client devices enrolled with the management service to provide security to the enterprise and enterprise data. However, when the devices are outside of the area protected by the enterprise and used for personal use, the devices, including the firmware installed on the devices, may become compromised. As such, while a management component executed on the client device can obtain status information from the OEM utility tools associated with the firmware and provide the status response to the management service, there is a risk that the response may not be trustworthy. Accordingly, it can be beneficial to implement a multi-step verification process that validates various information included in a response (e.g., certificate data, signature data, exit codes, etc.) before determining that a status response provided by a firmware utility on a managed device is trustworthy.

According to various examples, a managed client device can include a management component that interacts with a firmware utility that can obtain information associated with the firmware of the device. The firmware utility can be provided by an OEM of the client device or other third-party entity system, and can be configured to interact with an OEM system or other third-party entity system over a network. As needed, the management service of the enterprise can request a status of the firmware on the client device. This request can be received by the management component which can in turn request the firmware utility for a status update. The firmware utility can generate an exit code that corresponds to a given status of the firmware and can further request the OEM service to verify the status. Upon receiving verification in the form of a response file from the OEM system, the firmware utility can transmit the response file along with the firmware utility generated exit code to the management component. The response file can include a public certificate associated with the OEM, a signature, and other data. The response file can then be transmitted to the management service in response to the original request.

According to various examples, the management service can perform verification steps at multiple checkpoints to verify that the exit code and response file are trustworthy. For example, the management service can verify that the public certificate data is accurate in view of certificate data obtained directly from the OEM system. Upon verification, the certificate data can be used to generate a signature which can be compared to the signature in the response file. In addition, upon verification of the certificate date, the exit code provided by the firmware utility can be determined to be trustworthy. If any one of the comparisons in the different verification steps fail to produce a match, the management service can determine that the response file or firmware utility generated exit code is not to be trusted and can determine that the managed device is compromised.

In the event that one of the multi-checkpoint verification steps fails, the device can be considered compromised and subject to various compliance actions. The compliance actions can include, for example, limiting access to enterprise data, limiting access to one or more applications, wiping a device clean to reset the devices to the original factory settings, sending a notification to an enterprise administrator providing an indication of the detected compromise, and other types of compliance actions.

Another measure of protection and verification provided by the present disclosure includes the generation and use of a session key encrypted token or nonce. The nonce can be generated according to an agreement between the enterprise and the original equipment manufacture (OEM) or other entity associated with the managed client device. In various examples, data included in the status response can be securely exchanged between the entities in accordance to the nonce, functions of the nonce, and the agreement between the different entities. The use of the token or nonce as an extra measure of protection ensures the device and the provided responses are uncompromised. For example, the request for the response file by the management component can include a generated nonce. As such, the response file may include a function of the nonce that can be used to verify that the response file is uncompromised.

In addition, a predefined mapping of exit codes associated with different sources can be stored in a data store of the enterprise and accessible via the management service that oversees the management of the managed devices. The exit codes can correspond to different events with respect to the firmware. For example, an exit code can represent a success, a lack of a network connection, an indication that an application is executing with insufficient privileges, a server error, a nonce verification failure, a driver error, a validation failure, and other types of events with respect to the firmware and validation process. The exit code mapping can provide effective traceability of exit codes to events and can further allow for a pluggable extensibility with respect to different sources. For example, the exit codes mapping can define the associated source, the event, value, meaning, and user interface display for a given exit code. The exit code can be used by the management service to provide a status to the administrator of the enterprise with respect to the managed device.

With reference to FIG. 1, shown is an example of a networked environment 100. The networked environment 100 can include a computing environment 103, one or more client devices 106 (also called client device 106), and a third-party entity system 109 (e.g., OEM environment) in communication with one other over a network 112. The network 112 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can include, for example, a server computer, or any other system providing computing capability. Alternatively, the computing environment 103 can include a plurality of computing devices that are arranged, for example, in one or more server banks, computer banks, or other arrangements. The computing environments 103 can include a grid computing resource or any other distributed computing arrangement. The computing devices can be located in a single installation or can be distributed among many different geographical locations.

The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 106 remotely over the network 112, the computing environment 103 can be described as a remote computing environment 103.

Various applications can be executed in the computing environment 103. For example, a management service 115 and a management console 118, as well as other applications, may be executed in the computing environment. Also, various data is stored in a data store 121 that is accessible to the computing environment 103. The data store 121 may be representative of a plurality of data stores 121, which can include relational databases, object-oriented databases, hierarchical databases, hash tables or similar key-value data stores, as well as other data storage applications or data structures. The data stored in the data store 121 is associated with the operation of the various applications or functional entities described below. This data can include one or more device records 124, an exit code mapping 127, device compliance rules 130, a command queue 133, as well as potentially other data.

The management service 115 can be executed to oversee the operation of client devices 106 enrolled with the management service 115. In some examples, an enterprise, such as a company, organization, or other entity, can operate the management service 115 to oversee or manage the operation of the client devices 106 of its employees, contractors, customers, or other users having accounts with the enterprise. The management service 115 can further cause device records 124 to be created, modified, or removed from the data store 121. This can include creating or modifying a configuration profile for a client device 106 in response to detecting a potential compromise associated with a client device 106.

In various examples, the management service 115 can perform multiple verification steps to determine whether a client device 106 has been compromised. For example, the management service 115 can request a client device 106 periodically request the status of the firmware on the client device 106. By performing various verification checks using a status response received from the client device 106, the management service 115 can determine if the status response can be trusted or if there is any indication of a compromise with respect to the client device 106. In some examples, the status response can include a public certificate associated with the client device 106 and the corresponding OEM of the client device 106. One verification step can include requesting certificate data from a third-party entity service 136 of the third-party entity system 109. The request can be in the form of an application programming interface (API) call or other type of request. If the certificate data received from the third-party entity service 136 fails to match the certificate data included in the received status response, the management service 115 can determine that there is a compromise with the client device 106 and that the status response is untrustworthy.

In various examples, the management service 115 can perform various compliance actions in response to determining that the status response is untrustworthy. Compliance actions can include, for example, generating and sending a notification of the compromise to an administrator of the enterprise environment, causing the client device 106 to be wiped or otherwise cleaned of various software or settings (e.g., reset to factory settings), restricting access to one or more applications, restricting access to different types of data (e.g., enterprise data), or other actions that can ensure safety of the enterprise with respect to a compromised device.

Commands issued by the management service 115 for client devices 106, such as to update settings specified in a configuration profile, may be stored in the command queue 133 by the management service 115. As discussed later, the client device 106 may access the command queue 133 and retrieve and execute any commands stored in the command queue 133 for the client device 106.

The management console 118 provides an interface for client devices 106 to interact with and control the operation of the management service 115. For example, the management console 118 can include a web server that generates one or more web pages that can be displayed on the client device 106. An administrative user can interact with the web pages served by the management console 118 to add, remove, or modify device records 124. For instance, the administrative user could use the management console 118 to define device compliance rules 130, add, remove, or update exit codes in the exit code mappings 127, add, remove, or update device records 124, and/or other actions. In addition, the management console 118 can also provide a public application programming interface (API) that is accessible across the network 112. Standalone applications installed on a client device 106 can call or otherwise invoke one or more functions provided by the API to programmatically control the operation of the management service 115, including adding, removing, or modifying device records 124.

A device record 124 can represent data related to a client device 106 enrolled with or otherwise managed by the management service 115. Various types of information or data can be stored in a device record 124, such as the owner or user of a client device 106, policies applicable to a client device 106, configuration settings for the client device 106, the type of client device 106 (e.g., laptop, desktop, smartphone, or tablet), the manufacturer of the client device 106, the model of the client device 106, a list of applications installed on the client device 106 and the respective version, as well as other data. For example, the device record 124 could include a firmware profile 139 for the firmware installed on the client device 106. A firmware profile can represent configuration profile for the firmware 142 installed on a client device 106. For example, the firmware profile 139 can store values for various firmware properties 145, such as the current version of the firmware 142 installed or the version of the firmware 142 that is to be installed.

A firmware property 145 represents data regarding the firmware 142 installed on a client device 106. One example of a firmware property 145 is the current version of the firmware 142 installed on the client device 106. Another example of a firmware property 145 can include a status associated with the firmware 142. For example, a status can include an indicator associated with the current or prior status of the firmware 142. The status can indicate various factors such as, for example, lack of network, attestation pass, attestation failure, insufficient privileges for attestation, driver error, unsupported platform, nonce token verification failure, invalid signature, and/or other types of factors that can be associated with a firmware update.

Exit code mappings 127 include a predefined mappings of exit codes and exit code definitions associated with firmware or other software updates of client devices 106. For example, when an exit code is received from the client device 106 in response to a status request of the firmware 142, the management service 115 can refer to the exit code mappings 127 to identify an event and/or meaning that is associated with the exit code with respect to the status of the firmware. For example, an exit code having a value of "0" may indicate a successful validation associated with the firmware while a value of "1" may indicate a failed validation associated with the update. The exit code may represent a plurality of different types of events such as, for example, a lack of a network connection, invalid signature, validation success, validation failure, validation tampered, unknown validation error, invalid command line argument, application is running with insufficient privileges, an internal error, a server responded with an error, an issue with a driver occurred, invalid data used for validation, nonce verification failed, signed response certificate error, and/or other events. An exit code can comprise a numerical value, an alphanumerical number, or other type of value that can represent a particular event associated with the firmware. According to various examples, the exit code mappings 127 can be defined to correspond to different types of sources and OEMs such that different exit codes received from sources associated with the firmware can be mapped to be consistent with similar events. As such, across the board consistency can be achieved with respect to compliance actions and administrator notifications when compliance issues are detected among different devices associated with different OEMs.

In some examples, the exit code mappings 127 can indicate what to included in a notification or user interface that can be provided to an administrator or other entity of an enterprise organization associated with the management service 115 and managed devices. For examples, based on the exit code received or the detected compromise associated with the client device 106, the management service 115 can generate a notification or user interface to provide to the administrator via the management console 118 or other service as can be appreciated. The notification may indicate the type of event, the meaning associated with the event, an indication of a failure, an indication of a pass, an indication that the cause is unknown, and/or other type of notification.

Device compliance rules 130 include rules, models, and/or configuration data for the various algorithms or approaches employed by the management service 115. For example, the device compliance rules 130 can include the various models and/or algorithms used by the management service 115 in determining what type of compliance action to perform based on a received exit code, a detected device compromise, a detected untrustworthy status response, or other type of event. According to various examples, the device compliance rules 130 can be defined by an administrator of an enterprise via the management console 118.

A command queue 133 can represent a set of pending commands or instructions issued by the management service 115 to one or more client devices 106. In some implementations, a command queue 133 may be created for each client device 106 enrolled or registered with the management service 115. Configuration profiles, firmware status requests, or other commands or instructions for a client device may be stored in the command queue 133. At periodic intervals, the client device 106 may retrieve the commands or instructions from the respective command queue 133 for the client device 106. In other implementations, a single command queue 133 may be used for all client devices 106. In these implementations, each command or instruction stored in the command queue 133 may be tagged with a unique identifier for a client device 106. The client device 106 may, at periodic intervals, retrieve any commands or instructions from the command queue tagged with the respective unique identifier for the client device 106.

The client device 106 is representative of one or more client devices that may be connected to the network 112. Examples of client devices 106 include processor-based systems, such as desktop computers, a laptop computers, a personal digital assistant, a cellular telephone, a smartphone, a tablet computer system, smart speakers or similar headless devices, or any other device with like capability. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include firmware 142 that can provide low-level control of the operation of the hardware of the client device 106. In some instances, firmware 142 can provide a standardized operating environment for more complex software executing on the client device 106. For example, the PC-compatible Basic Input/Output System (PC-BIOS) used by many desktops, laptops, and servers initializes and test system hardware components, enables or disables hardware functions as specified in the PC-BIOS configuration, and the loads a boot-loader from memory to initialize an operating system 148 of the client device 106. The PC-BIOS also provides a hardware abstraction layer (HAL) for keyboard, display, and other input/output devices which may be used by the operation system 148 of the client device 106. The Unified Extensible Firmware Interface (UEFI) provides similar functions as the BIOS, as well as various additional functions such as Secure Boot, a shell environment for interacting with the client device 106, network 112 connectivity for the client device 106, and various other functions. Other client devices 106 may use other implementations of firmware 142 (e.g., OpenFirmware/OpenBoot, Coreboot, Libreboot, and similar implementations)

A client device 106 can include an operating system 148 configured to execute various client applications. Examples of operating systems 148 include MICROSOFT WINDOWS®, APPLE macOS®, APPLE iOS®, GOOGLE ANDROID®, and various distributions of Linux. The client applications can include web browsers, enterprise applications, social networking applications, word processors, spreadsheet applications, and media viewing applications. The client device 106 can also execute the management component 151 and the firmware utility 154.

The management component 151 can be executed by the client device 106 to maintain data communication with the management service 115 in order to perform various actions on the client device 106 in response to instructions received from the management service 115. In some instances, the management component 151 includes a separate application executing on the client device 106. In other instances, the management component 151 includes a device management framework provided by or included in the operating system 148 installed on the client device 106. The management component 151 can be configured to contact the management service 115 at periodic intervals and request that the management service 115 send any commands or instructions stored in the command queue 133 to the management component 151. The management component 151 can then cause the client device 106 to perform the commands (e.g., provide status request, wipe client device 106, etc.) provided by the management service 115 or cause the client device 106 to modify the configuration settings installed on the client device 106 in accordance to any updated or received configuration profiles received from the management service 115.

The firmware utility 154 can be executed by the client device 106 to collect information associated with the firmware 142 on the client device 106. In some embodiments, the firmware utility 154 may expose an application programming interface (API) that can be used by other applications, such as the management component 151, to interact with the firmware 142. For example, the API exposed by the firmware utility 154 may allow the management component 151 to update the installed version of the firmware 142, request an status for the firmware 142, modify a configuration setting for the firmware 142 or check a value for a particular firmware property of the installed firmware 142 or configuration setting of the installed firmware 142. Because firmware 142 is often customized for each make and model of a client device 106 due to various hardware differences between vendors or models, the firmware component 151 is often provided by the manufacturer of the client device 106. For example, DELL, HP, LENOVO, and other manufacturers may provide their own firmware utility 154 for client devices 106 that they manufacture.

The device manufacturer can be associated with a third-party entity system 109 that includes a third-party entity service 136 that can interact with the firmware utility 154 installed on the client device 106. According to various examples, upon receiving a request for a firmware status, the firmware utility 154 can determine a status for the firmware 142 of the client device 106 and request that the third-party entity service 136 verify the determined status for the firmware 142. In some examples, the interaction between the firmware utility 154 and the OEM service 136 can be through an API call or other type of communication over the network 112.

The third-party entity system 109 represents one or more computing devices that can be operated by an OEM of the client device 106. The third-party entity system 109 can execute the third-party entity service 136, as well as other services. The third-party entity service 136 can interact with the firmware utility 154 to verify a status of a firmware on the client device 106. In some examples, the third-party entity service 136 can interact with the management service 115 to provide up-to-date certificate data which can be used to validate a response file received by the management service 115 in response to a status request. In some examples, the management service 115 can invoke an API call to request and obtain certificate data for verification.

Figure 2:
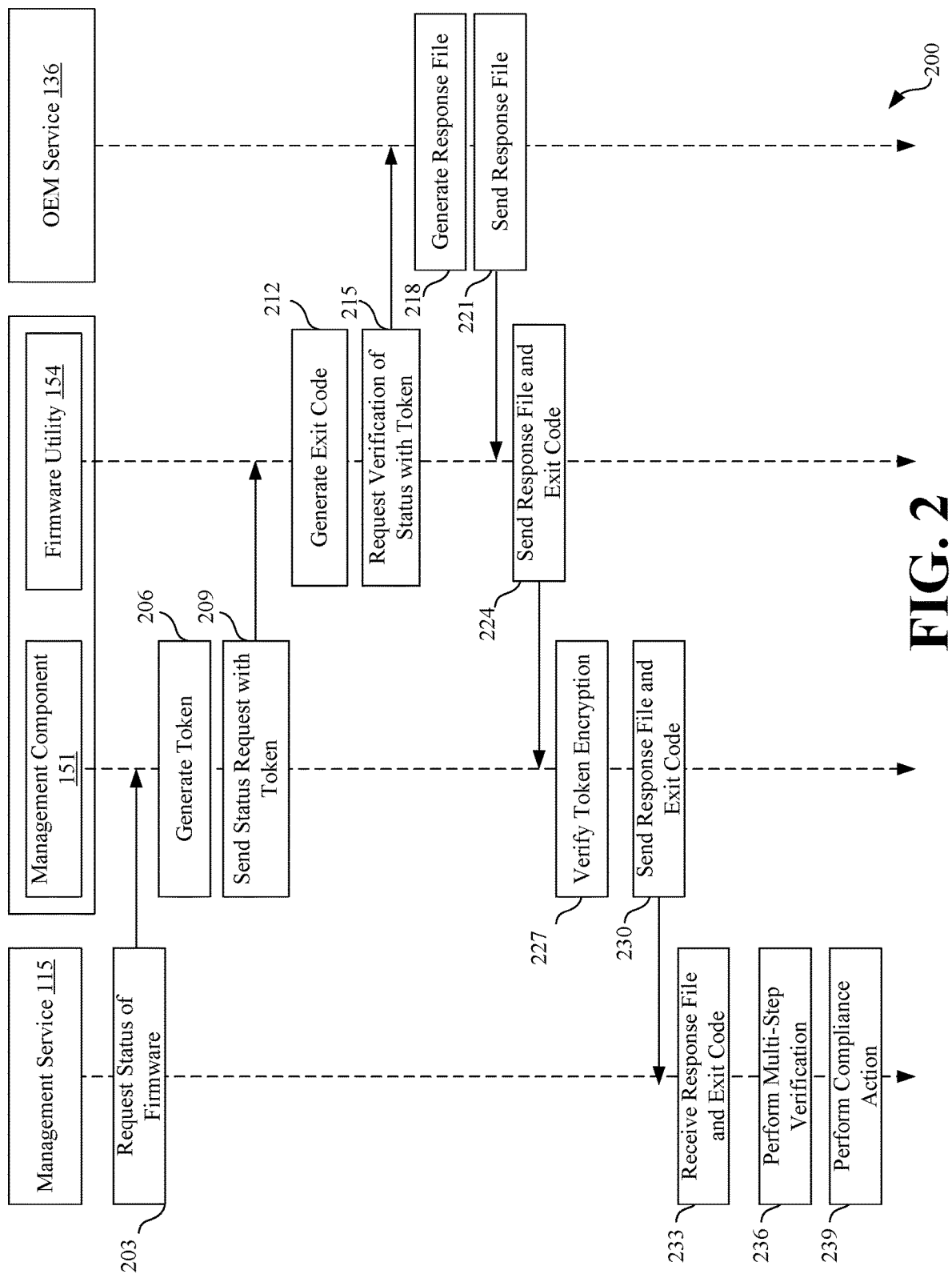
FIG. 2 is a sequence diagram depicting the operation of components of the network environment of FIG. 1.

Turning now to FIG. 2, shown is a sequence diagram 200 illustrating functionality implemented by components of the networked environment 100. It is understood that the sequence diagram of FIG. 2 provides merely an example of the many different types of functional arrangements that can be employed to implement the portions of the networked environment 100 as described herein. As an alternative, the sequence diagram of FIG. 2 can be viewed as depicting an example of elements of a method implemented within the networked environment 100 in some implementations, At step 203, the management service 115 requests a status of firmware installed on a managed client device 106. In some examples, the management service 115 instructs the management component 151 to provide the status of the firmware 142 periodically at random or predefined intervals. In some examples, the management service 115 can store the status request in the command queue 133 for access by the managed client device 106.

At step 206, the management component 151 can receive the status request and generate a session key encrypted token or nonce for that can be used for security. The token or nonce can comprises a randomly generated number that can be used to ensure communications with the firmware utility 154 are session-specific and therefore, not reused. In particular, based on security functions established between the enterprise and OEM, the use of the nonce can be used to ensure secure and current transactions. In some examples, the token or nonce can be generated by the management service 115 and included in the status request. The management component 151 can encrypt the token in accordance with an agreement and key exchange between the enterprise and the OEM. As such, the third-party entity service 136 is able to use the token for signature generation which helps in verifying that the response received is for the requesting device 106 and not another device.

At step 209, the management component 151 can generate and send a status request with the generated token to the firmware utility 154 associated with the firmware. The status request can indicate that the management component 151 requests information about the current status of the firmware. In some examples, the management component 151 can invoke an application programming interface (API) call provided by the OEM to communicate with the firmware utility and request the status. In addition to the status request, the management component 151 provides the generated encrypted token for use by the firmware utility 154 and third-party entity service 136 in generating the response file.

At step 212, the firmware utility 154 generates an exit code associated with the status of the firmware. For example, the status may correspond to a lack of a network connection, a validation failure, a validation tampering, a server error, a driver issue, or other type of event associated with the status of the firmware.

At step 215, the firmware utility 154 can request verification of the status by the third-party entity service 136 in the third-party entity system 109. In some examples, the firmware utility 215 can invoke an API call to communicate with the third-party entity service 136 and request verification. In addition to requesting the verification and validation of the firmware status, the firmware utility 215 can send the generated token that is session-specific and can be used in validation and verification of responses received from the third-party entity service 136.

At step 218, the third-party entity service 136 generates a response file in response to receiving the verification request from the firmware utility 154. The response file can include a public certificate associated with the OEM of the client device 106, a signature associated with the certificate, an OEM generated exit code based on the validation of the firmware status by the firmware utility, and other data. In some examples, the third-party entity service 136 can encrypt the data based on the nonce and in accordance with an agreement between the enterprise and the OEM. As such, the response file provides a function of the nonce that can be used to verify the response file by the management component 151 and management service 115.

At step 221, the third-party entity service 136 transmits the response file to the firmware utility 154. For example, the third-party entity service 136 can send the response file verifying the status of the firmware 142 to the firmware utility 154 via a connection over the network 112.

At step 224, the firmware utility 154 sends the response file received from the third-party entity service 136 and the firmware utility 154 generated exit code to the management component 151 in response to the request at step 209. The firmware utility 154 send the response file and exit code to the management component 151 via an API call or other type of communication as can be appreciated. The transmission of the response file and the exit code can include a timestamp and the nonce or other token which can be used by the management component 151 for further verification.

At step 227, the management component verifies the encryption of the nonce that was received in the response along with the timestamp on the response. In particular, the nonce is generated for session-specific tasks to avoid abuse by reusing responses to hide the presence of an attack or other type of compromise. In addition, the encryption of nonce that is exchanged in the various requests between the management component 151, firmware utility 154, and third-party entity service 136 can be modified as the nonce is decrypted and encrypted to perform the various established functions. The management component 151 is thus able to verify that the encryption is consistent with the original token from step 206 and that the timestamp of the response file is consistent with the current status request. In the event of a detected mismatch or issue, the management component 151 can notify the management service 115 accordingly. As such, the management service 115 can perform compliance actions to ensure the security of the enterprise in view of the compromised device 106.

At step 230, the management component 151 can send the response file and the firmware utility generated exit code to the management service 115. For example, the management component 151 can transmit the response file and the firmware utility generated exit code to the management service 115 over the network 112 through a wired or wireless connection.

At step 233, the management service 115 receives the response file and exit code from the management component 151.

At step 236, the management service 115 performs multiple verification steps to verify the response file and the exit code received from the management component 151. As discussed in greater detail with regard to FIG. 3, the management service 115 can perform multiple verification and validation steps with respect to the certificate, signature, and exit code included in the response file received from the management component 151. For example, the management service 115 can verify the certificate chain associated with the public certificate in the response file by comparing the public certificate data with certificate data received from the third-party entity system 109. In addition, upon verifying the certificate data, the management service 115 can generate a signature and compare the signature to the signature included in the response file. Further, the management service 115 can determine if the firmware utility exit code provided alongside the response file is valid based on a comparison of the certificate chain associated with the certificate in the response file with the certificate chain provided by the third-party entity service 136. If the certificate chains match, the management service 115 can determine that the exit code provided by the firmware utility can be trusted and is therefore valid. In some examples, the management service 115 can compare an OEM generated exit code included in the response file with the firmware utility generated exit code provided alongside the response file from the firmware utility 154. In the event that one of the multi-checkpoint verification steps fails, the device can be considered compromised and subject to various compliance actions, such as, for example, limiting access to enterprise data, limiting access to one or more applications, wiping a device clean to reset the devices to the original factory settings, sending a notification to an enterprise administrator providing an indication of the detected compromise, and other types of compliance actions.

At step 239, the management service 115 can perform compliance actions in accordance to the exit code associated with the response based on whether the exit code response is trusted or determined to be untrustworthy. If there was a detected failure at any one of the verification checkpoints and the response file is determined to be untrustworthy, the exit code can be modified to reflect the reason for the response being untrustworthy. For example, in the event of a certificate mismatch, the exit code can be modified to the value that is mapped to the event of a certificate mismatch. The compliance actions can include, for example, limiting access to enterprise data, limiting access to one or more applications, wiping a device clean to reset the devices to the original factory settings, sending a notification to an enterprise administrator providing an indication of the detected compromise, and other types of compliance actions. For actions including a modification of a configuration profile to limit access to data or applications or to reset the device to original factory settings, the management service 115 can provide an instruction or command associated with the compliance action in the command queue 133. Upon receipt, the management component 151 can comply accordingly. Thereafter, this portion of the process proceeds to completion.

Figure 3:
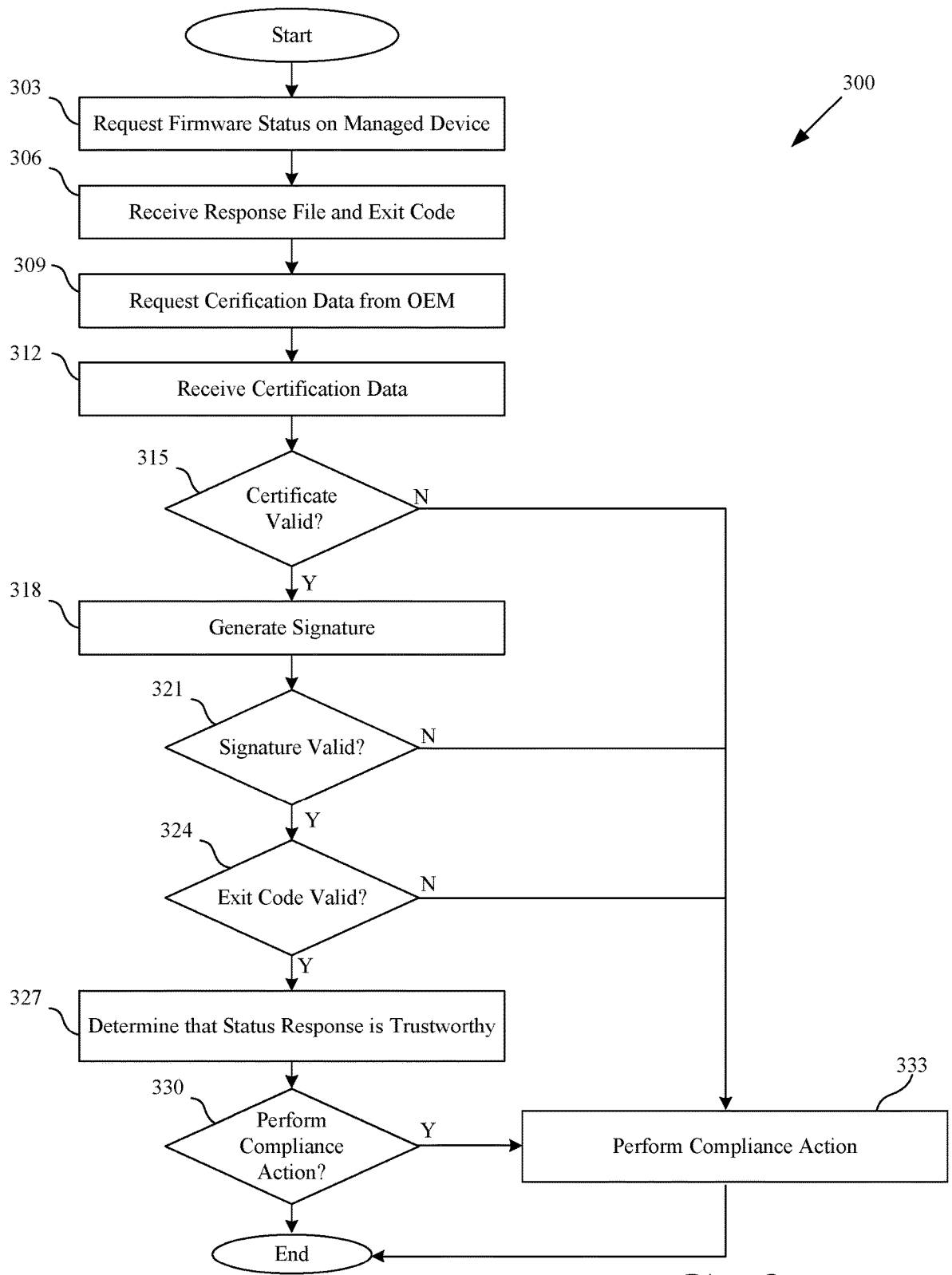
FIG. 3 is a flowchart depicting the operation of an example of a component of the computing environment of the network environment of FIG. 1.

Moving on to FIG. 3, shown is a flowchart that provides one example of the operation of a portion of the management service 115. The flowchart of FIG. 3 can be viewed as depicting an example of elements of a method implemented by the management service 115 executing in the computing environment 103 according to one or more examples. The separation or segmentation of functionality as discussed herein is presented for illustrative purposes only.

Beginning at step 303, the management service 115 requests a firmware status for firmware on a managed device 106. In some examples, the management service 115 instructs the management component 151 to provide the status of the firmware 142 periodically at random or predefined intervals. In some examples, the management service 115 can store the status request in the command queue 133 for access by the managed client device 106.

At step 306, the management service 115 receives the response file and firmware utility generated exit code from the management component 151 executing on the client device 106. The response file can include a public certificate associated with the OEM of the client device 106, a signature associated with the certificate, an OEM generated exit code based on the validation of the firmware status by the firmware utility, and/or other data. The response file can be generated by the third-party entity service 136 in response to a validation response from a firmware utility 154 executing on the client device 106. The firmware utility generated exit code corresponds to the exit code generated by the firmware utility 154 in response to the status request.

At step 309, the management service 115 requests certification data from the third-party entity service 136 executing on third-party entity system 109. For example, the management service 115 can request the certification data via an API call associated with the third-party entity service 136. The API call can invoke the third-party entity service 136 to provide current and up-to-date certificate data associated with the OEM.

At step 312, the management service 115 receives the certificate data from the third-party entity service 136. The certificate data can comprise a single certificate or a certificate chain that can included an ordered list of certificates associated with the OEM. The certificate data can be used to verify that the sender of the data and all corresponding certificates are trustworthy. The certificate data can include an expiration date, a name of the certificate issuer, a location of the certificate origin, or other data. In some examples, the management service 115 can retrieve stored certificate data stored in the data store 121. However, the stored certificate data may not be as current and up to date as the certificate data provided from the third-party entity service 136.

At step 315, the management service 115 can determine whether the certificate included in the response file is valid. In particular, the management service 115 can compare the certificate data included in the response file with the certificate data received from the third-party entity service 136. If the certificate data matches, the management service 115 can determine that the certificate included in the response file is valid. As such, the process proceeds to step 318. Otherwise, the management service 115 can determine that the certificate data is not valid and that the response file cannot be trusted. If the certificate data cannot be trusted, the process proceeds to step 333. In some examples, the management service 115 can modify the exit code associated with the corresponding status request to the value associated with the event of an invalid certificate.

At step 318, the management service 115 generates a signature according to the certificate data. For example, the signature can be generated by encrypting data included in the digital certificate and/or other data included in the response file to verify the authenticity of the received data. The signature can be encrypted according to keys generated in accordance to agreements between the enterprise and the OEM.

At step 321, the management service 115 determines if the signature included in the response file is valid. For example, the management service 115 compares the signature in the response file with the signature generated based on the valid certificate data. If the signatures match, the management service 115 can determine that the signature included in the response file is valid. As such, the process proceeds to step 324. Otherwise, the management service 115 can determine that the signature is not valid and that the response file cannot be trusted. If the signature cannot be trusted, the process proceeds to step 333. In some examples, the management service 115 can modify the exit code associated with the corresponding status request to the value associated with the event of an invalid signature.

At step 324, the management service 115 can determine if the firmware utility exit code provided alongside the response file is valid. In some examples, the management service 115 determines that the firmware utility exit code is valid in response to comparing the certificate chain associated with the certificate in the response file with the certificate chain provided by the third-party entity service 136. If the certificate chains match, the management service 115 can determine that the exit code provided by the firmware utility can be trusted and is therefore valid. In some examples, the management service 115 can determine if the OEM generated exit code included in the response file matches the firmware utility exit code. If the exit codes match, the management service 115 can determine that the exit codes are valid. As such, the process proceeds to step 327. Otherwise, the management service 115 can determine that the exit codes are not in sync with one another and therefore, the exit code and response file cannot be trusted. If verification fails, the process proceeds to step 333. In some examples, the management service 115 can modify the exit code associated with the corresponding status request to the value associated with the event of invalid exit codes.

At step 327, the management service 115 can determine that the status response is trustworthy. As such, the management service 115 can act as needed based on the exit code and additional data received in the response file from the client device 106.

At step 330, the management service 115 determines if event associated with the trusted exit code and firmware status requires a compliance action. For example, the exit code may indicate a failure that requires administrator intervention. As such, the exit code may require that a notification be generated and sent to the administrator of the enterprise. In other situations, the exit code may not correspond to an event that requires a compliance action. As such, the management service 115 may store the status associated with the exit code in the firmware profile 139.

At step 333, the management service 115 can perform a compliance action based on the exit code, if trusted, and/or the detection of a compromised device in view of a verification step failure. Compliance actions can include, for example, generating and sending a notification of the compromise to an administrator of the enterprise environment, causing the client device 106 to be wiped or otherwise cleaned of various software or settings (e.g., reset to factory settings), restricting access to one or more applications, restricting access to different types of data (e.g., enterprise data), or other actions that can ensure safety of the enterprise with respect to a compromised device. In some examples, the management service 115 may issue a command for the client device 106 based on the detected compliance issue and store the command in the command queue 133 by the management service 115. For example, the management service 115 may store an updated configuration profile with settings restricting access to various applications in the enterprise to protect the enterprise and enterprise data in the command queue 133. The management component 151 can then adjust the client device settings in view of the obtained configuration profile. Thereafter, the process ends.

The client devices 106 or devices comprising the computing environment 103 and third-party entity system 109 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the management component 151 and potentially other applications. Also stored in the memory can be a data store 121 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display upon which a user interface generated by the management console 118, the management component 151, firmware utility 154, or another application can be rendered. In some examples, the user interface can be generated using user interface data provided by the computing environment 103. The client device 106 can also include one or more input/output devices that can include, for example, a capacitive touchscreen or other type of touch input device, fingerprint reader, or keyboard.

Although the management service 115, management console 118, the management component 151, the firmware utility 154, third-party entity service 136, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowchart of FIGS. 2 and 3 show examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowchart of FIGS. 2 and 3 show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
   a computing device comprising a processor and a memory; and
   machine-readable instructions stored in the memory which, when executed by the processor, cause the computing device to at least:
   send a request to a client device for a status of firmware installed on the client device;
   receive, from the client device, a response to the request, the response comprising a status response file generated by a device manufacturer and provided to a firmware utility on the client device and a first exit code generated by the firmware utility on the client device, the status response file comprising at least a certificate, a signature associated with the certificate, and a second exit code generated by the device manufacturer, the first exit code and the second exit code corresponding to a given status of the firmware installed on the client device;
   perform a certificate verification based at least in part on the certificate included in the status response file;
   perform a signature verification based at least in part on the signature included in the status response file, at least if the certificate verification does not indicate that the status response file has been compromised;
   perform an exit code verification based at least in part on at least one of the first exit code generated by the firmware utility or the second exit code included in the status response file, at least if the signature verification does not indicate that the status response file has been compromised;
   determine whether the response is untrustworthy, based at least in part on one or more of the certificate verification, the signature verification, and the exit code verification; and
   perform a compliance action if the response is determined to be untrustworthy.

2. The system of claim 1, wherein the machine-readable instructions, when executed by the processor, further cause the computing device to at least:
   send a certificate data request to a third-party entity service;
   receive certificate data from the third-party entity service; and
   perform the certificate verification by comparing the certificate data with the certificate included in the status response file, wherein the status response file is determined to be compromised in an instance in which the certificate data fails to match the certificate.

3. The system of claim 2, wherein the signature included in the status response file comprises a first signature, and the machine-readable instructions, when executed by the processor, further cause the computing device to at least:
   generate a second signature based at least in response to the certificate data; and
   perform the signature verification by at least comparing the first signature to the second signature, wherein the status response file is determined to be compromised in an instance in which the first signature fails to match the second signature.

4. The system of claim 1, wherein the exit code verification comprises determining to trust the second exit code in response to validating a certificate chain associated with the certificate.

5. The system of claim 1, wherein the machine-readable instructions, when executed by the processor, further cause the computing device to at least determine the status of the firmware based on the first exit code and a predefined exit code mapping stored in a data store.

6. The system of claim 1, wherein the compliance action comprises at least one of:
   generating and sending a notification of a detected compromise to an, administrator;
   defining at least one access restriction for the client device; or restoring factory settings on the client device.

7. The system of claim 1, wherein the machine-readable instructions, when executed by the processor, further cause the computing device to at least:

generate a configuration profile modifying configuration settings associated with the client device in an instance in which the status response file is determined to be compromised; and send the configuration profile to the client device.

8. A non-transitory computer-readable medium embodying executable instructions which, when executed by a computing device, cause the computing device to at least:

send a request to a client device for a status of firmware installed on the client device;

receive, from a firmware utility on the client device, a response to the request, the response comprising a status response file generated by a device manufacturer and provided to a firmware utility on the client device and a first exit code generated by the firmware utility on the client device, the status response file comprising at least a certificate, a signature associated with the certificate, and a second exit code generated by the device manufacturer, the first exit code and the second exit code corresponding to a given status of the firmware installed on the client device;

perform a certificate verification based at least in part on the certificate included in the status response file;

perform a signature verification based at least in part on the signature included in the status response file, at least if the certificate verification does not indicate that the status response file has been compromised;

perform an exit code verification based at least in part on at least one of the first exit code generated by the firmware utility or the second exit code included in the status response file, at least if the signature verification does not indicate that the status response file has been compromised;

determine whether the response is untrustworthy, based at least in part on one or more of the certificate verification, the signature verification, and the exit code verification; and perform a compliance action if the response is determined to be untrustworthy.

9. The non-transitory computer-readable medium of claim 8, further comprising executable instructions which, when executed by the computing device, further cause the computing device to at least:

send a certificate data request to a third-party entity service;

receive certificate data from the third-party entity service; and perform the certificate verification by comparing the certificate data with the certificate included in the status response file, wherein the status response file is determined to be compromised in an instance in which the certificate data fails to match the certificate.

10. The non-transitory computer-readable medium of claim 9, wherein the signature included in the status response file comprises a first signature, and further comprising executable instructions which, when executed by the computing device, further cause the computing device to at least:

generate a second signature based at least in response to the certificate data; and perform the signature verification by at least comparing the first signature to the second signature, wherein the status response file is determined to be compromised in an instance in which the first signature fails to match the second signature.

11. The non-transitory computer-readable medium of claim 8, wherein the exit code verification comprises determining to trust the second exit code in response to validating a certificate chain associated with the certificate.

12. The non-transitory computer-readable medium of claim 8, further comprising executable instructions which, when executed by the computing device, further cause the computing device to at least determine the status of the firmware based on the first exit code and a predefined exit code mapping stored in a data store.

13. The non-transitory computer-readable medium of claim 8, wherein the compliance action comprises at least one of:

generating and sending a notification of a detected compromise to an, administrator;

defining at least one access restriction for the client device; or restoring factory settings on the client device.

14. The non-transitory computer-readable medium of claim 8, further comprising executable instructions which, when executed by the computing device, further cause the computing device to at least:

generate a configuration profile modifying configuration settings associated with the client device in an instance in which the status response file is determined to be compromised; and send the configuration profile to the client device.

15. A computer-implemented method, comprising:

sending, by at least one computing device, a request to a client device for a status of firmware installed on the client device;

receiving, by the at least one computing device and from the client device, a response to the request, the response comprising a status response file generated by a device manufacturer and provided to a firmware utility on the client device and a first exit code generated by the firmware utility on the client device, the status response file comprising at least a certificate, a signature associated with the certificate, and a second exit code generated by the device manufacturer, the first exit code and the second exit code corresponding to a given status of the firmware installed on the client device;

performing, by the at least one computing device, a certificate verification based at least in part on the certificate included in the status response file;

performing, by the at least one computing device, a signature verification based at least in part on the signature included in the status response file, at least if the certificate verification does not indicate that the status response file has been compromised;

performing, by the at least one computing device, an exit code verification based at least in part on at least one of the first exit code generated by the firmware utility or the second exit code included in the status response file, at least if the signature verification does not indicate that the status response file has been compromised;

determining, by the at least one computing device, whether the response is untrustworthy, based at least in part on one or more of the certificate verification, the signature verification, and the exit code verification; and performing, by the at least one computing device, a compliance action if the response is determined to be untrustworthy.

16. The computer-implemented method of claim 15, further comprising:

sending, by the at least one computing device, a certificate data request to a third-party entity service;

receiving, by the at least one computing device, certificate data from the third-party entity service; and performing, by the at least one computing device, the certificate verification by comparing the certificate data with the certificate included in the status response file, wherein the status response file is determined to be compromised in an instance in which the certificate data fails to match the certificate.

17. The computer-implemented method of claim 16, wherein the signature included in the status response file comprises a first signature, and further comprising:

generate a second signature based at least in response to the certificate data; and perform the signature verification by at least comparing the first signature to the second signature, wherein the status response file is determined to be compromised in an instance in which the first signature fails to match the second signature.

18. The computer-implemented method of claim 15, wherein the exit code verification comprises determining to trust the second exit code in response to validating a certificate chain associated with the certificate.

19. The computer-implemented method of claim 15, further comprising determining the status of the firmware based on the first exit code and a predefined exit code mapping stored in a data store.

20. The computer-implemented method of claim 15, wherein the compliance action comprises at least one of:

generating and sending a notification of a detected compromise to an, administrator;

defining at least one access restriction for the client, device; or restoring factory settings on the client device.

* * * * *